Aug. 14, 1945.  A. T. CAPE ET AL  2,382,395
METHODS OF AND APPARATUS FOR DIRECT REDUCTION OF IRON ORES
Filed June 30, 1942  4 Sheets-Sheet 3

INVENTOR.
ARTHUR T. CAPE, CHARLES V. FOERSTER,
AND HOWARD L. GRISWOLD.
BY
ATTORNEYS.

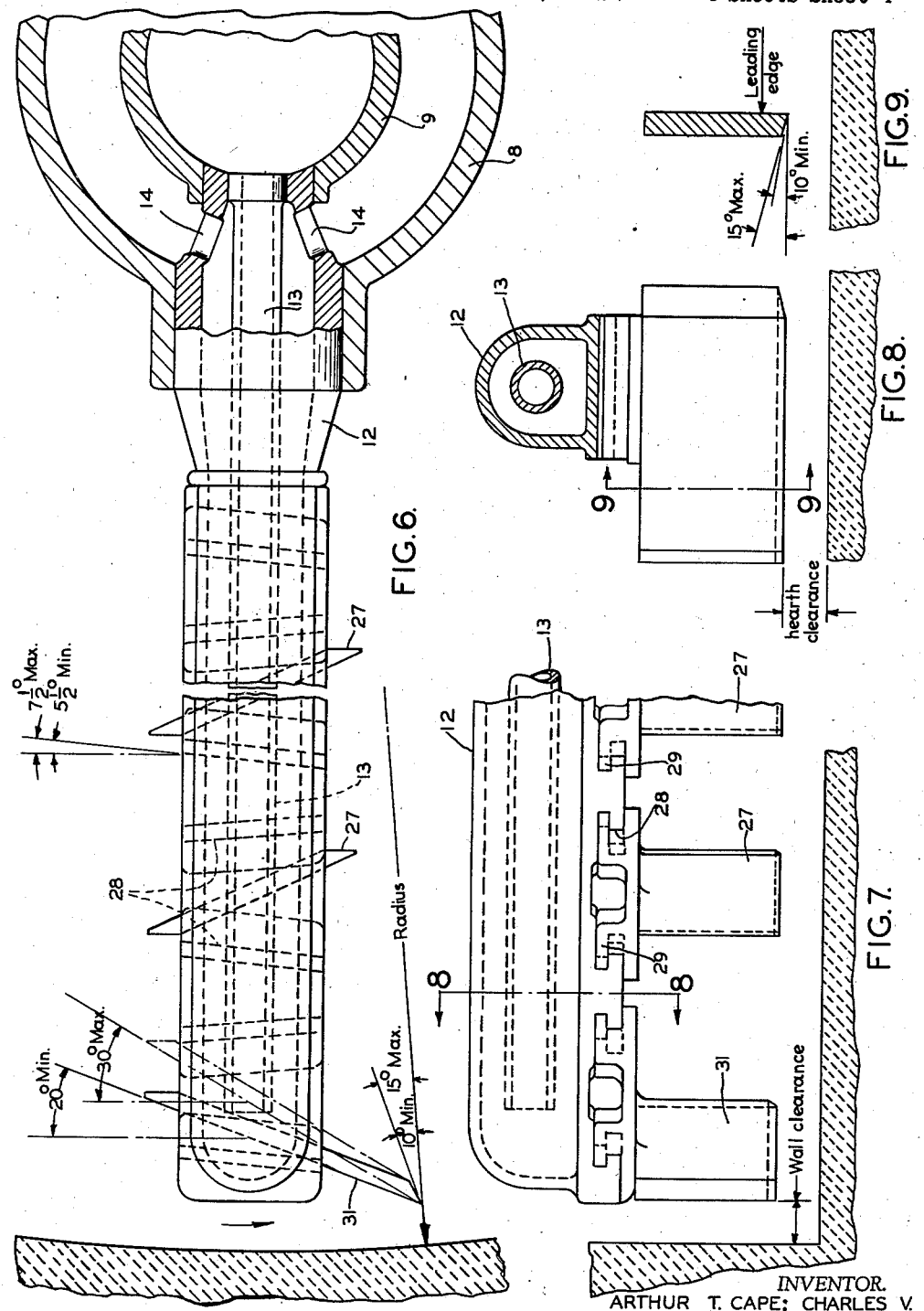

Patented Aug. 14, 1945

2,382,395

UNITED STATES PATENT OFFICE 2,382,395

METHOD OF AND APPARATUS FOR DIRECT REDUCTION OF IRON ORES

Arthur T. Cape, Santa Cruz, Calif., and Charles V. Foerster and Howard L. Griswold, Canton, Ohio, assignors to Coast Reduction, Inc., Watsonville, Calif.

Application June 30, 1942, Serial No. 449,088

8 Claims. (Cl. 75—34)

This invention relates, as indicated, to methods of and apparatus for the direct reduction of iron ores.

Furnaces of the multiple-hearth type, common examples of which are the Nichols-Herreshoff and Wedge furnaces, have heretofore been used principally for roasting, calcining and drying. Due to difficulties in the handling of iron ores in this type of furnace, attempts to use such furnaces for the direct reduction of iron ores have been uniformly unsuccessful.

We have discovered, however, as the result of a series of development programs, that we are able to directly reduce iron ores to sponge iron, in commercially desirable quantities, through the use of a structurally-modified furnace of the multiple hearth type, and by observing certain precautions in the handling and treatment of the ores and reducing gases.

We accomplish this by a method which can best be described with reference to the accompanying drawings, which show, in a more or less diagrammatic manner, apparatus and arrangements thereof, which are well-suited to the carrying out of the object of the invention.

In said annexed drawings:

Fig. 5 is a diagrammatic plan view, showing the preferred arrangement of the furnace and gas generators;

Fig. 6 is an enlarged plan view of one of the rabble arms, as viewed in Fig. 4;

Fig. 7 is an enlarged view, partly in elevation and partly in section, of the rabble arm of Fig. 6, as viewed in the direction indicated by the arrows 7—7 in Fig. 4;

Fig. 8 is a transverse cross-sectional view, taken on the line 8—8 of Fig. 7; and Fig. 9 is a cross-sectional view, taken on the line 9—9 of Fig. 8.

Figure 1:
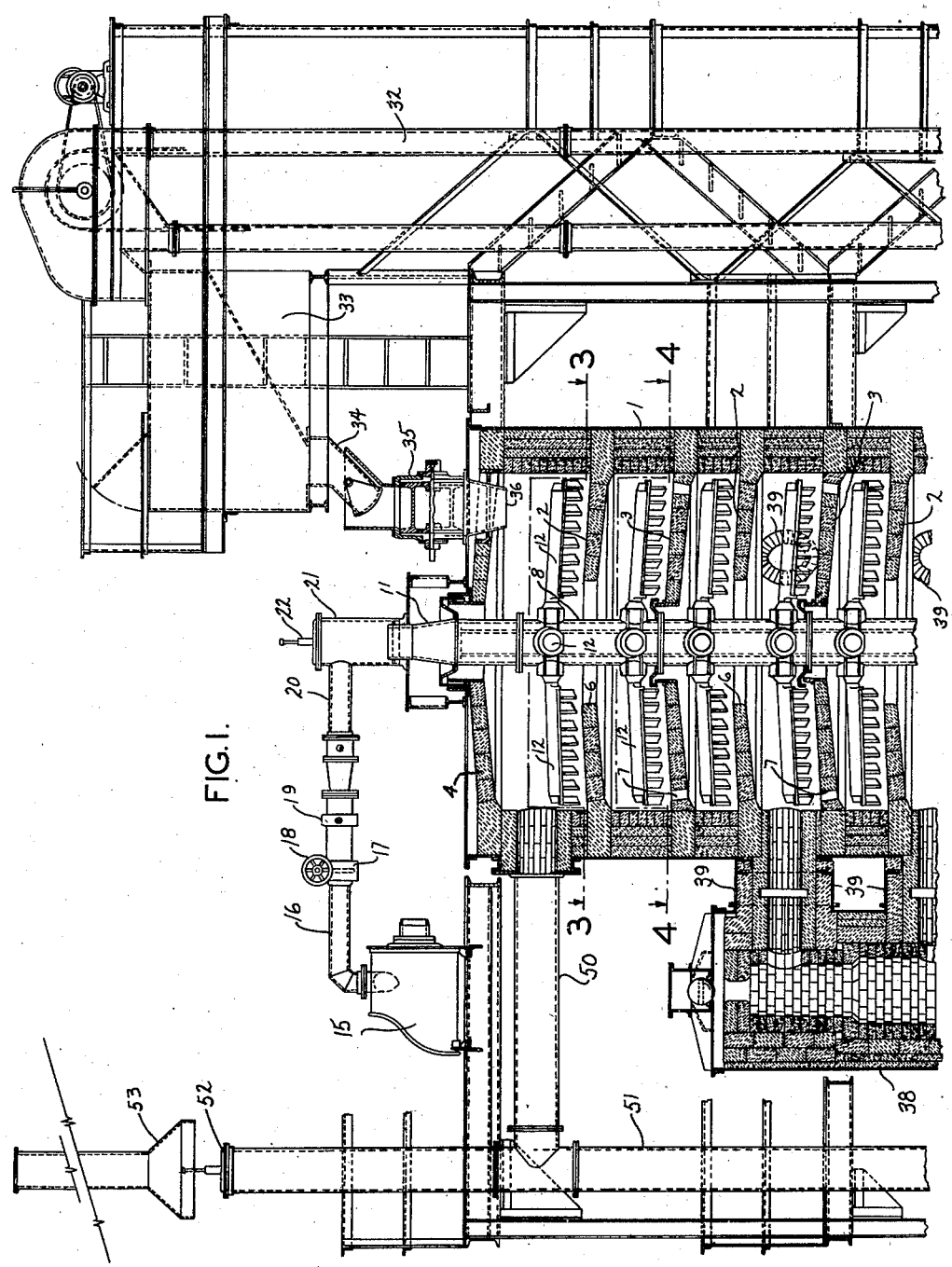
Fig. 1 is a view, partly in elevation and partly in section, of the upper portion of a multiple-hearth furnace, and auxiliary apparatus, embodying the invention.

Referring more particularly to the drawings, it will be seen that an important element of the apparatus is a furnace 1, of the multiple-hearth type, such furnace consisting of a cylindrical shell, suitably lined with refractory material, and having a multiplicity of vertically-spaced annular hearths 2 and 3, also formed of refractory material, and preferably inclined downwardly, in a radially-outward direction. The furnace is provided at the top with a refractory-lined cover 4 and at the bottom with a refractory-lined bottom closure 5, which functions as a hearth, but is not inclined, as are the other hearths.

The hearths 2 and 3 are alternately arranged, the hearths 2 being known as "in" feed hearths, and the hearths 3 as "out" feed hearths. The "in" feed hearths have a central circular port or opening 6 and the "out" feed hearths have a series of circumferentially spaced ports or openings 7 disposed closely adjacent but in spaced relation to the lining of the shell 1 of the furnace.

Extending centrally through the furnace is a shaft 8 consisting of a cast iron or alloy iron column constructed in sections and through which extends a tube 9, also formed of cast or alloy iron. The shaft 8 terminates at a point adjacent the bottom 5 of the furnace, but the tube 9 extends below the bottom of the furnace and is provided with a bracket 10 whereby the shaft 8 is supported in concentric spaced relation to the tube 9. The tube 9 is closed at the top but the shaft 8 has a tapered section 11 which extends above the closed end of the tube 9 and into which air may be introduced for a purpose to be presently described.

Attached to the shaft 8, at points somewhat above the level of each hearth, are a number of rabble arms 12. In the present case, four such rabble arms are disposed above each hearth, these rabble arms being arranged at approximately ninety degrees from each other. Each rabble arm is constructed with a central steel tube or a partition 13, which is open at its outer end and extends to and communicates with the tube 9. The rabble arm is also provided with ports 14 opening into the annular space or compartment between the shaft 8 and tube 9.

Air, or a suitable gas, supplied under pressure, by a blower 15, passes through a conduit 16, thence through a regulating damper 17, which may be operated by a handwheel 18 through a worm and gear drive, thence through an air flow meter 19, conduit 20, conduit 21 and into the tapered section 11 of the shaft 8. The conduit 21 is provided at the top with an air pressure relief 22.

Rotation of the shaft and rabble arms is accomplished by means of a motor (not shown), through the intermediary of a reduction gear 23, bevel pinion 24 and bevel gear 25, the latter being keyed or otherwise rigidly secured to the tube 9. The tube 9 is mounted upon a thrust bearing generally indicated by reference numeral 26.

Figure 3:
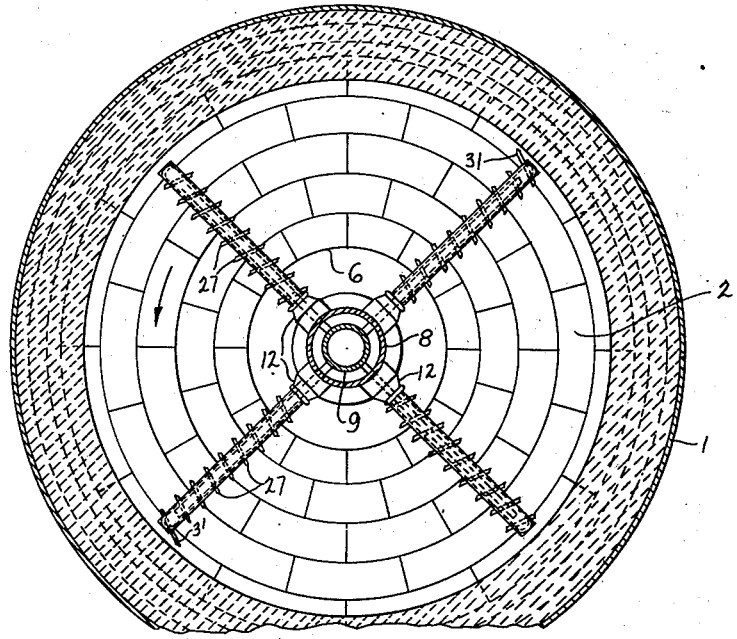
Fig. 3 is a transverse cross-sectional view through the furnace, taken on the line 3—3 of Fig. 1.
Figure 4:
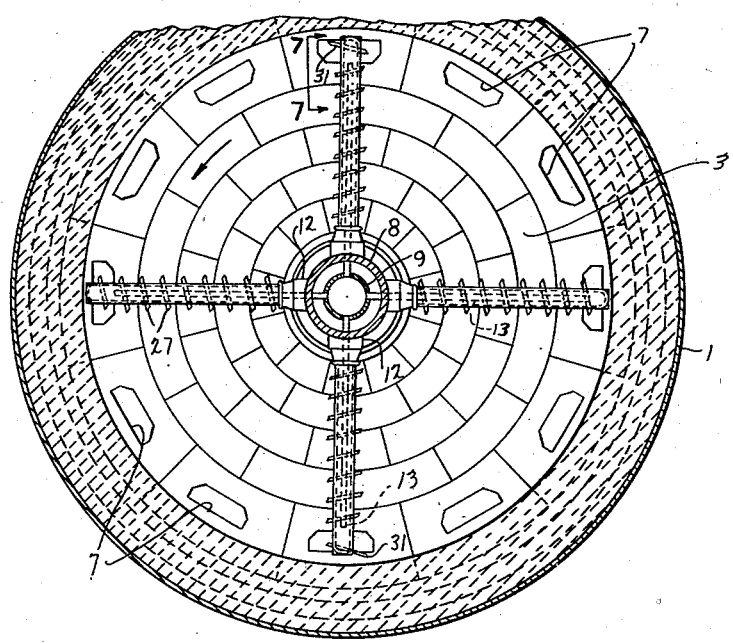
Fig. 4 is a transverse cross-sectional view through the furnace, taken on the line 4—4 of Fig. 1.

Removably secured to each of the rabble arms is a plurality of rabbles 27, the rabbles above the "in" feed hearths being inclined and arranged in such manner as to gradually push the ore on these hearths towards the central opening or port 6, and the rabbles above the "out" feed hearths being inclined and arranged in such a manner as to gradually push the ore on these hearths towards the openings or ports 7. The general arrangement of the rabbles is clearly shown in Figs. 3 and 4. As shown in Figs. 6, 7, 8, and 9, the rabble arms are preferably constructed with a series of dovetail recesses 28 along the underside of the arm, these recesses extending transversely of the arm and being adapted for the reception of dovetail tenons 29 which are cast integrally with the rabbles. If desired, spacers may be inserted between some of the rabbles, these spacers serving to prevent exceptionally high ridges forming in the ore bed and also to prevent the tops of such ridges as are formed from coming into contact with the relatively cool rabble arms. Since these rabbles and spacers have their tenons entered into the dovetail grooves from the forward or leading edges of the rabble arms, there is no tendency for the rabbles to become loosened at any time during the rabbling operation, yet the rabbles can be easily removed from the arms for replacement or repair purposes.

In addition to the rabbles and spacers, one or more of the rabble arms at each hearth level may be provided at its end with a wall scraper 31, which may be secured to the rabble arm in the same manner as the rabbles and spacers, or, if desired, a scraper may be cast integrally with the end rabble. These scrapers are designed to prevent accumulation of the ore on the inner wall of the furnace or at points on the hearths adjacent such wall, where such material could not be removed by the rabbles.

Figure 2:
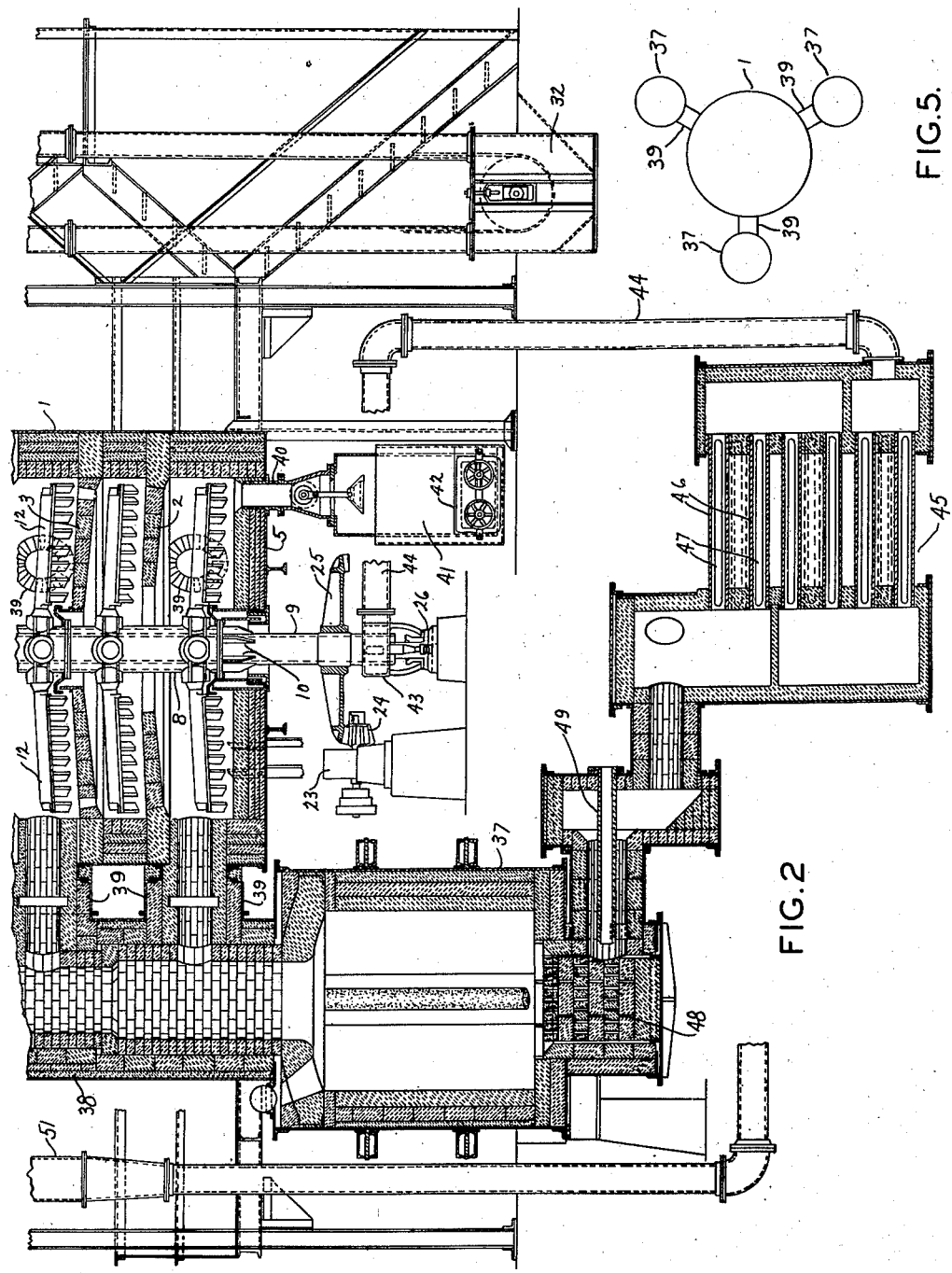
Fig. 2 is a view similar to Fig. 1, but showing the lower part of the furnace and auxiliary apparatus.

Ore is fed onto the uppermost hearth 2 of the furnace in the following manner: The ore is transported to a point above the level of the top of the furnace by means of an elevator 32 (Figs. 1 and 2), and is deposited into a bin 33, which, may, if desired, be heated to remove excess moisture from the ore, and the ore flows by gravity from this bin, through a chute 34 and into a rotary feeder 35, whence the ore may be dropped, in measured amounts onto the hearth through a funnel 36.

The process also involves supplying reducing gases to the hearths, at as many levels as desired, and for this purpose, gas generators, generally indicated at 37, are provided. These generators are substantially like those described in the copending application of Howard L. Griswold, Ser. No. 372,228, and need not, therefore, be further described. These generators are supplied with natural gas which has been preheated to approximately 1000° F., and air which has been preheated to approximately 2000° F., and the preheated gas and air are subjected in the generators to a treatment which has been fully described in the above copending application as well as in the copending application of Arthur T. Cape and Charles V. Foerster, Serial No. 449,087, to provide a reducing gas consisting principally of carbon monoxide and hydrogen, and at a temperature in excess of about 2000° F. The hot reducing gases issue from the generators into stacks 38 lined with a suitable refractory and heat conserving material, and from these stacks, which thus serve as manifolds, the reducing gases enter the furnace at points directly above the hearths through lined conduits 39. In the preferred form of the invention, three generators are employed, spaced 120 degrees apart, about the furnace, and each stack 38 has at least three outlets, through which the reducing gases enter the three lowermost hearths of the furnace.

With the foregoing description in mind, the process may now be briefly described.

The ore, usually iron ore, which may or may not have admixed therewith a suitable inert material, is dropped, in regulated quantities, onto the uppermost hearth 2, at a point adjacent the outer periphery of this hearth. The ore, thus supplied, is gradually rabbled inwardly by the rabbles above this hearth, and eventually dropped through the opening 6 in the hearth, and onto the central portion of the hearth 3. The rabbles directly above the hearth 3 then carry the ore radially outwardly on the hearth 3 to the ports or openings 7, and the ore falls through these openings onto the next lower hearth 2. This movement is continuous so that the ore finally falls onto the hearth 5.

During the aforesaid movement of the ore, the reducing gases, to which reference has been made, enters the furnace at the various lower hearth levels, and as the result of the countercurrent flow of the ore and reducing gases, the ore is gradually reduced, without fusion, to the form of sponge iron, the relatively hot sponge iron being discharged from the hearth 5 through a conduit 40 and into a water-jacketed sealed cooler 41, whence it may be removed, when cool, through a door 42. The reducing gas, supplied by the generators is, as stated, hot, and if not all, at least a portion of the heat required for the reduction of the ore, which includes not only the heating of the ore but the reduction of the ore itself, as well as such heat which must be supplied to counteract radiation and cooling losses, is supplied by means of the sensible heat of the generator gas. This is of special importance in connection with the control of the multiple-hearth furnace at various hearth levels. In other words, it may be desirable to introduce the hottest gas, not at the bottom of the furnace, but, in the intermediate stage or stages, while the bottom and top stages are held at substantially lower temperatures. In other cases, it may be found advisable, depending upon the type of ore used, to introduce the hottest gas at the bottom. A highly flexible method of controlling the temperature and reduction is thus provided.

The rabble arms are meanwhile, cooled by air supplied by the blower 15, such air, after entering the section 11 of the shaft 8 passing into the annular chamber between the shaft and the tube 9, thence into the ports 14 and through the space between the rabble arm and the tube 13, thence into the outer end of the tube, through the tube 13 and into the tube 9. The air, which, by this time, has been heated to a temperature of approximately 750° F., may be utilized for the gas generators 37, and for this purpose, the air is removed through the tuyère 43, which surrounds the lower end of the tube 9, and passes through a conduit 44 into an air preheater 45, preferably consisting of Carbofrax tubes 46, provided with Corebusters 47. The air is additionally heated by the heater 45 to a temperature of about 2000° F., and is then passed directly into the air-gas mixing chamber 48 of the generator 37. The natural gas for the generator, after being preheated in a heater (not shown) is supplied to the gas mixing chamber 48 through a tube 49.

The spent or partially spent reducing gases leave the furnace through a duct 50, and pass thence into a vertical stack 51, from which they may be piped to the burners of the air and gas preheaters. A pressure relief 52 is provided at the upper end of the stack 51, and a vent pipe 53 is provided, for the removal of any escaping gases to the outside of the building.

It is apparent from the foregoing that we have provided a highly efficient method of and apparatus for the direct reduction of iron ores, and that various changes may be resorted to in both the method and apparatus, without departing from the scope of the invention. For example, if desired, the cooling air for the rabble arms may be introduced into the lower end of the tube 9, in which event it will enter the tubes 13 and pass thence into the annular spaces in the rabble arms about these tubes, and finally into the annular chamber between the tube 9 and shaft 8, being removed at the top of the furnace, instead of at the bottom. Moreover, it is not necessary to cool all of the rabble arms, and under certain conditions, the rabble arms in the upper portion of the furnace need not be cooled. Furthermore, in some cases, it may be desirable to use an induced, instead of a forced, draft system of cooling the rabble arms, or a combination of both the forced and induced draft systems may be used.

It will be noted that the openings 7 in the hearth 3 are located at some distance from the inner wall of the furnace, so as to keep the material falling away from the walls instead of against them, as is the usual practice in roasting ores.

The rabbles are set at such angles to the rabble arms upon which they are mounted that they move the ore at a desired rate of speed, while rabbling the ore in a thorough and efficient manner. These angles are necessarily so calculated that squeezing of the ore against the hearth, during movement of the ore, is carefully avoided.

The maximum and minimum angles for the scrapers, between which limits best results are secured, are shown in Figs. 6 and 9.

As previously stated, a suitable gas, such as natural gas, may be used as a coolant, instead of, or in addition to, air. In particular, the gas thus employed as a coolant is preferably of such a character as to be adapted for entering into the reaction with air in the gas generators 38 to form the desired reducing gas, which is to be supplied to the hearths in the manner described. If such a reducing gas is used as a coolant, its temperature, as it issues from the furnace, i. e., after it has served its purpose as a coolant, is of the order of about 850° F. At this temperature, there will be little or no decomposition of ordinary natural gas. This will be evident from the fact that at a temperature even as high as 980° F., the amount of hydrogen formed from the decomposition of methane will be less than 3%. It also happens that owing to the great heat capacity of natural gas, less natural gas is required to effect the same degree of cooling than would be the amount of air required.

Where coke oven gas is employed in the reduction of iron ores, such gas can well be employed as the cooling agent.

It may also be pointed out that some of the rabble arms can be cooled by gas and some by air. For example, in the lower portion of the furnace, where leakage from the rabble arms into the furnace might occur, the arms are preferably cooled by gas, whereas, in the upper portion of the furnace, where leakage is not a detrimental factor, air can be used satisfactorily.

It is also desirable, under certain conditions, to introduce jets of air into the upper hearths of the furnace in order to ignite the reducing gases, and thereby substantially preheat the ore before the ore encounters the highly reducing conditions in the lower portion of the furnace.

It is also to be understood that while the method has been described particularly as applied to the reduction of iron ores, that it may be applied to other types of ores in which reduction may be effected under conditions similar to those which have been described in connection with iron ores.

Moreover, the application is not limited to the use of a reducing gas such as described in the aforesaid application, Serial No. 449,087, but any suitable reducing gas may be used, such for example as the gas described in the copending application of Cape, Brassert and Thomas, Serial No. 456,690.

While we have described the use of the multiple-hearth furnace as a means of producing sponge iron, it will be readily understood that it may also be used to effect preheating of the ore and as a means of obtaining only partial or substantially partial reduction of ores, the partially reduced ore being then further or completely reduced in another type of furnace, as for example, in a shaft furnace of the type described in United States Patent No. 2,231,760.

Other modes of applying the principle of our invention may be employed instead of the one explained, change being made as regards the means and the steps herein disclosed, provided those stated by any of the following claims or their equivalent be employed.

We therefore particularly point out and distinctly claim as our invention:

1. The method which comprises causing an ore to be gradually moved downwardly in a multiple-hearth type furnace, generating a reducing gas consisting principally of carbon monoxide and hydrogen by interaction in a gas generator of natural gas preheated to a temperature of at least 1000° F. and air preheated to a temperature of at least 1600° F., causing said reducing gas to move upwardly through said furnace in countercurrent relation to the ore, cooling the ore moving parts of said furnace by means of air, removing the cooling air after it has served its purpose to a heater whereby said air is further heated, utilizing said heated air in said gas generator, removing the spent or partially spent reducing gas from said furnace, and utilizing said removed gas in the burners of said heater and the heater by which the natural gas is preheated.

2. In combination, a multiple-hearth type furnace having ore-moving parts, a reducing gas generator, means for supplying reducing gases from said generator into said furnace, means for supplying air to the ore moving parts of said furnace for cooling the same, a heater, means for passing said air after it has served its purpose, through said heater and into said generator, and means for removing the spent or partially spent reducing gases from said furnace and supplying the same to the burners of said heater.

3. In combination, a multiple-hearth type furnace having ore-moving parts, a reducing gas generator, means for supplying reducing gases from said generator into said furnace, means for supplying natural gas and air to said generator, including heaters for separately preheating said natural gas and air, means for supplying air to the ore moving parts of said furnace for cooling the same, means for passing said air, after it has served its purpose, through said air preheater, and into said generator, and means for removing the spent or partially-spent reducing gases from said furnace and supplying the same to the burners of said natural gas and air preheaters.

4. The method which comprises causing an ore to be gradually moved successively across the hearths of a multiple-hearth furnace and downwardly from each successive hearth to the hearth below while causing a reducing gas to move upwardly in counter-current and intimate relation to the ore and effect a reducing action upon the ore, increments of reducing gas being added at a plurality of hearth levels to the ascending stream of gas to control the temperature of the reaction and to control temperature variations throughout the furnace.

5. In combination, a multiple hearth type furnace having a continuous passage for ore and gas from the upper to the lower part thereof; means for moving ore across the respective hearths and successively from higher to lower hearths and means for introducing reducing gas at a plurality of hearth levels to provide an upward flow of gas through the furnace countercurrent to the downward movement of the ore and a control of the temperature of the reaction.

6. The method of reducing iron ores which comprises gradually moving the ore downwardly through a multiple-hearth type furnace, and, at the same time, introducing a reducing gas into said furnace at a plurality of the hearth levels thereof and causing said gas to move upwardly through said furnace in countercurrent relation to the ore, the introduction of said gas at a plurality of hearth levels serving to control temperature variations throughout the furnace.

7. The method of reducing iron ores which comprises causing the ore to be gradually moved downwardly in a multiple-hearth type furnace, having substantially horizontal hearths and means for mechanically causing the ore to traverse said hearths, while causing a reducing gas to move upwardly through said furnace in countercurrent relation to the ore, said reducing gas being heated to a temperature such that the sensible heat thereof is sufficient to supply substantially all of the heat necessary for the reduction of the ore and for counterbalancing the heat radiation and cooling losses of the furnace, said reducing gas being introduced into a plurality of the hearth levels whereby to control temperature variations throughout the furnace.

8. The method of reducing iron ores which comprises causing the ore to be gradually moved downwardly in a multiple-hearth type furnace, while causing a reducing gas to move upwardly through said furnace in countercurrent relation to the ore, said reducing gas being heated to a temperature such that the sensible heat thereof is sufficient to supply substantially all of the heat necessary for the reduction of the ore and for counterbalancing the heat radiation and cooling losses of the furnace, said reducing gas being introduced into a plurality of the hearth levels of the furnace, whereby to control temperature variations throughout the furnace.

ARTHUR T. CAPE.
CHARLES V. FOERSTER.
HOWARD L. GRISWOLD.